United States Patent [19]

Dantlgraber et al.

[11] Patent Number: 5,332,371

[45] Date of Patent: Jul. 26, 1994

[54] HYDRAULIC SYSTEM

[75] Inventors: Jörg Dantlgraber, Lohr-Sackenbach; Reiner Püschel, Lohr/Main, both of Fed. Rep. of Germany

[73] Assignee: Mannesmann Rexroth GmbH, Lohr/Main, Fed. Rep. of Germany

[21] Appl. No.: 13,694

[22] Filed: Feb. 4, 1993

[30] Foreign Application Priority Data

Feb. 7, 1992 [DE] Fed. Rep. of Germany ....... 4203619

[51] Int. Cl.$^5$ ............................................. F04B 17/00
[52] U.S. Cl. ................................... 417/363; 417/217; 417/410 R
[58] Field of Search .......... 417/360, 361, 363, 410 R, 417/415, 271

[56] References Cited

U.S. PATENT DOCUMENTS

| | | | |
|---|---|---|---|
| 1,880,108 | 2/1929 | Ross | 418/107 |
| 2,017,302 | 10/1935 | Yoder | 417/363 |
| 2,762,311 | 9/1956 | Litzenberg | 417/360 |
| 2,915,978 | 12/1959 | Schaefer | 417/363 |
| 2,928,961 | 3/1960 | Morrill | 417/363 |
| 2,968,961 | 1/1961 | McGregor | 417/271 |
| 3,604,820 | 9/1971 | Scheller | 417/363 |
| 3,890,882 | 6/1975 | Bobier | 41/487 |
| 3,936,238 | 2/1976 | Wycliffe | 417/363 |
| 3,982,856 | 9/1976 | Hehl | 417/360 |

FOREIGN PATENT DOCUMENTS

| | | |
|---|---|---|
| 908448 | 4/1954 | Fed. Rep. of Germany . |
| 2359597 | 6/1975 | Fed. Rep. of Germany . |
| 2544536 | 4/1977 | Fed. Rep. of Germany . |
| 2815632 | 11/1978 | Fed. Rep. of Germany . |
| 7918270 | 9/1979 | Fed. Rep. of Germany . |
| 2908407 | 7/1980 | Fed. Rep. of Germany . |
| 2934666 | 3/1981 | Fed. Rep. of Germany . |
| 3212429 | 10/1983 | Fed. Rep. of Germany . |
| 3619957 | 9/1986 | Fed. Rep. of Germany . |
| 9201176 | 1/1992 | PCT Int'l Appl. . |

Primary Examiner—Richard A. Bertsch
Assistant Examiner—Peter Korytnyk
Attorney, Agent, or Firm—Emrich & Dithmar

[57] ABSTRACT

The present invention relates to a noise dampening assembly of a hydraulic machine and a drive motor, and provides for a structure comprising a block, in which the hydraulic machine is mounted by means of noise dampening elements.

10 Claims, 1 Drawing Sheet

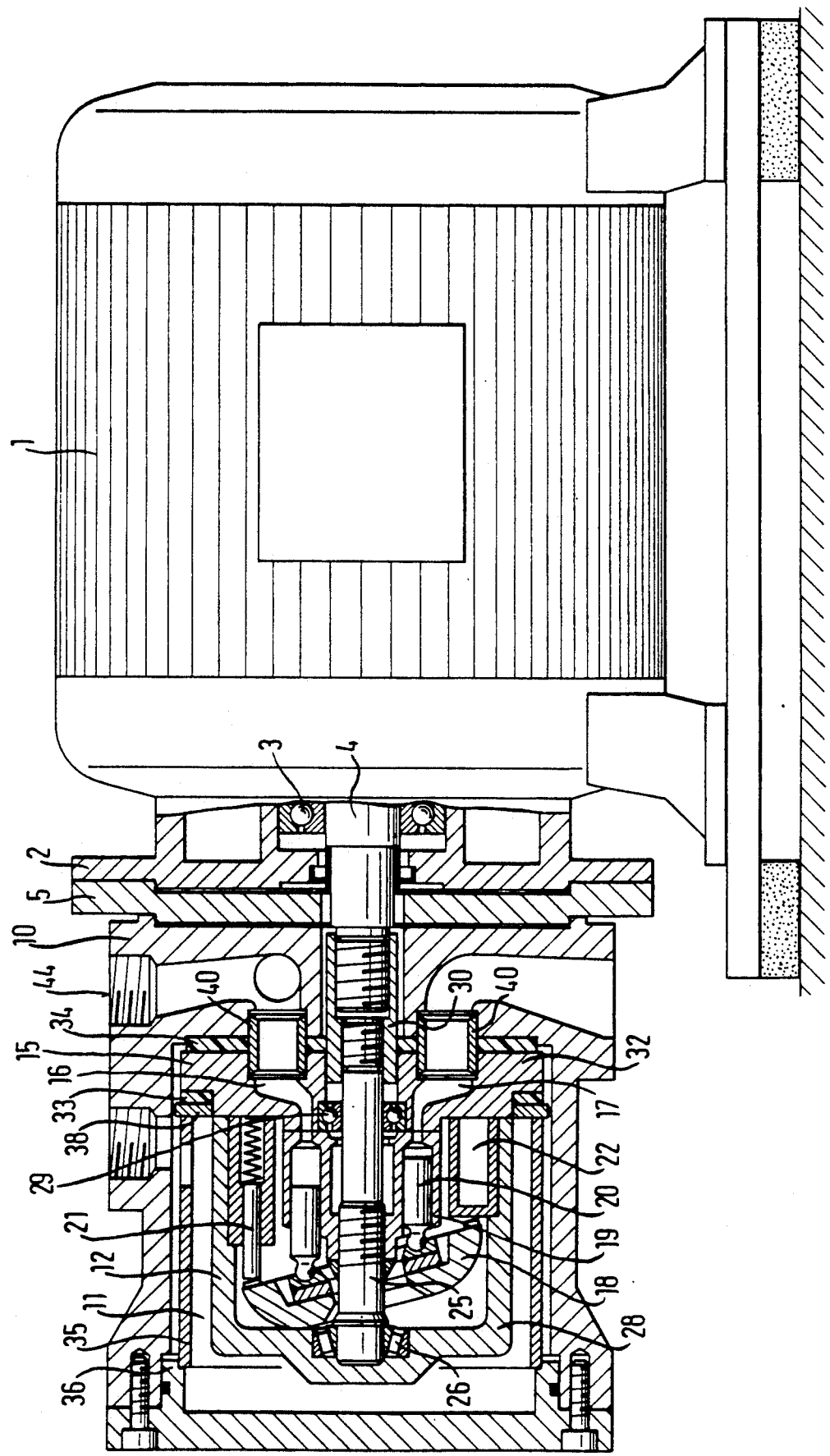

HYDRAULIC SYSTEM

BACKGROUND OF THE INVENTION

1. Field of the Invention

The present invention relates to a hydraulic system comprising a hydraulic machine, in particular of the axial piston type, a drive motor and a support structure, wherein the hydraulic machine is mounted to the front face of the motor and wherein the motor is mounted to the support structure.

2. Description of the Prior Art

In the design of motor pump units, it is within the common knowledge of the artisan to mount the pump housing, in particular the housing of an axial piston pump, to the front face of an electrical motor. Thus the vibrations generated by the operating pump pistons are transmitted to the housing. To dampen those vibrations, the drive motor is usually attached to a support structure by means of silent blocks. The hydraulic controls including the valve means are mounted to the stator of the machine. The known arrangement suffers from a number of drawbacks, i.e. the airborne noise of the hydraulic pump is freely radiated, the hydraulic controls are stimulated to vibrate due to the vibrations propagating from the pump through the hydraulic tubes, these vibrations being transferred to the support structure the expenditure for mounting the hydraulic blocks is high.

SUMMARY OF THE PRIOR ART

The object of the present invention is to provide an arrangement in which the noise insulation is improved and the expenditure of assembly is decreased.

SUMMARY OF THE PRIOR ART

The object referred to is solved by the features listed in claim 1. Further features are defined in the subclaims.

According to the invention the hydraulic pump is arranged within a block such that the transfer of vibrations to the block and thus to the drive motor is substantially dampened by the noise reducing elements. More specifically, the base plate, or respectively the control plate of an axial piston machine is mounted in the cavity of the block by means of noise dampening inserts. The internal cavity of the block may be used as the leaking oil space of the pump such that the regular pump housing can be eliminated. According to this particular embodiment, the shaft and the swash plate of the pump is supported by a fork or a yoke. The arrangement according to the invention is particularly suited for axial piston type machines having a constant or variable displacement volume.

The valves required for the hydraulic machine may be either mounted within the block or may be secured to the outer face of the block.

The bottom of the block receiving the machine can be arranged to either face towards the drive motor or away from it. In the latter embodiment, the opening of the block is closed by a cover. According to a particularly useful aspect of the invention, the hydraulic pump is mounted within the block by means of a tube providing an axial bias to the base plate of the machine. In particular the inner side of the tube may be provided with noise dampening means.

BRIEF DESCRIPTION OF THE DRAWING

A particularly preferred embodiment of the present invention is described below with reference to the single FIGURE of the drawings showing a drive motor to which front end an axial piston type machine shown in section is mounted including noise dampening means according to the invention.

DESCRIPTION OF THE PREFERRED EMBODIMENT

The drawings show an electrical motor 1 including a front end cover plate 2 housing an anti-fricition bearing 3 for supporting the motor shaft 4. A block 10 having a cavity 11 for accomodating an axial piston pump 12 is mounted to the cover plate 2 through an intermediate flange 5.

The axial piston pump 12 comprises a base plate or a control plate 15, including inlet and outlet ports 16, 17, a cylinder drum 19, a number of pistons 20 and adjusting means 21, 22 for the angle of a swash plate 18. The shaft 25 of the axial piston machine is supported at 26 in a housing 28, or in a yoke or a support structure not shown. Furthermore, the shaft is rotably supported by a bearing 29 in an axial bore of the base plate 15. The shaft 25 is directly coupled by a threaded coupler 30 to the motor shaft 4. The housing 28 supporting the swash plate 18 is secured to the base plate 15. The base plate 15 further serves to axially fix the cylinder drum 19 and for mounting the adjusting means 21 22.

The base plate 15 is provided with a flange 32. At either side of the flange 32, machine-borne noise dampening elements 33, 34 are provided which are axially biased when the unit is mounted according to the invention to dampen the structure-borne noise. To this end, the embodiment shown comprises a tube 35 which is supported by a shoulder of a housing cover 36 and an annular portion 38 which bears against the noise dampening element 33 and clamps it against the flange 32. Accordingly, in securing the cover 36, the tube 35 is urged toward the elements 33, 34 and the flange 32 by means of the portion 38 such that the pump is fixedly mounted in the cavity of the block 10. The internal side of the tube 35 is preferably provided with a noise dampening material not shown.

Fitting pieces 40 inserted in the block 10 provide for centering the pump 12 and for the in- and out-flow of the hydraulic fluid. The embodiment illustrated does not show the valves which can be mounted to the upper top face 44 of the block 10.

Different embodiments of the invention are possible. The annular portion 38 may be screwed to the block 10 to bias the base plate 15 of the machine between the elements 33 and 34. The valves may be accomodated in the cavity of the block which must be suitably dimensioned. Still further, the cavity 11 in the block 10 may be opened towards the drive motor 1 such that the base plate or control plate 15 faces the housing cover which then preferably defines a closed bottom of the block. In either embodiment the noise is dampened by securing the machine through the biased noise dampening elements within the block. The block 10 itself further provides a secondary noise dampening since the block has a large mass which is suited to highly dampen vibrations transferred to the block. The fitting pieces 40 preferably comprise two pieces, having an intermediate layer of rubber vulcanized thereto to prevent the transfer of machine-borne noise to the block 10.

We claim:

1. In a hydraulic system including a drive motor having an output shaft at a front end, a block mounted on the front end of the motor and defining a cavity, and a hydraulic machine disposed in the cavity and coupled to the output shaft, the improvement comprising: an annular flange on the hydraulic machine, first and second noise dampening elements respectively disposed against opposite sides of said flange, and cover structure mountable on the block for closing the cavity, said cover structure including a clamping portion cooperating with the block for clamping therebetween said flange and said noise dampening elements, thereby to securely mount the hydraulic machine on the block.

2. The hydraulic system of claim 1, wherein said first noise dampening element is disposed between said flange and the block, said clamping portion including an annular portion disposed against said second noise dampening element.

3. The hydraulic system of claim 2, wherein said cover structure includes a cover plate fixed to the block and a tubular portion extending between said cover plate and said annular portion.

4. The hydraulic system of claim 3, wherein said cover plate and said tubular portion and said annular portion are discrete elements.

5. The hydraulic system of claim 3, wherein the hydraulic machine is disposed within said tubular portion.

6. The hydraulic system of claim 1, and further comprising threaded fastening means fixedly securing said cover structure to the block for axially biasing together said annular flange and said noise-dampening elements and the block axially of the motor.

7. The hydraulic system of claim 1, wherein the hydraulic machine includes a base plate, said annular flange being integral with said base plate.

8. The hydraulic system of claim 7, wherein said block has ports formed therein and said base plate has channels formed therein, and further comprising fitting pieces providing communication between said ports and said channels and serving to position the hydraulic machine relative to the block.

9. The hydraulic system of claim 1, wherein the block has first and second ends respectively disposed adjacent to and remote from the output end of the drive motor, the block having an end wall closing the cavity at the first end of the block, said cover structure closing the cavity at the second end of the block.

10. The hydraulic system of claim 1, wherein the cavity is dimensioned to provide clearance around the hydraulic machine to define a leak oil space therefor.

* * * * *